Nov. 25, 1969  G. A. BALL ET AL  3,480,122
SELF-SYNCHRONIZING GEAR COUPLER
Filed Feb. 6, 1968  4 Sheets-Sheet 1
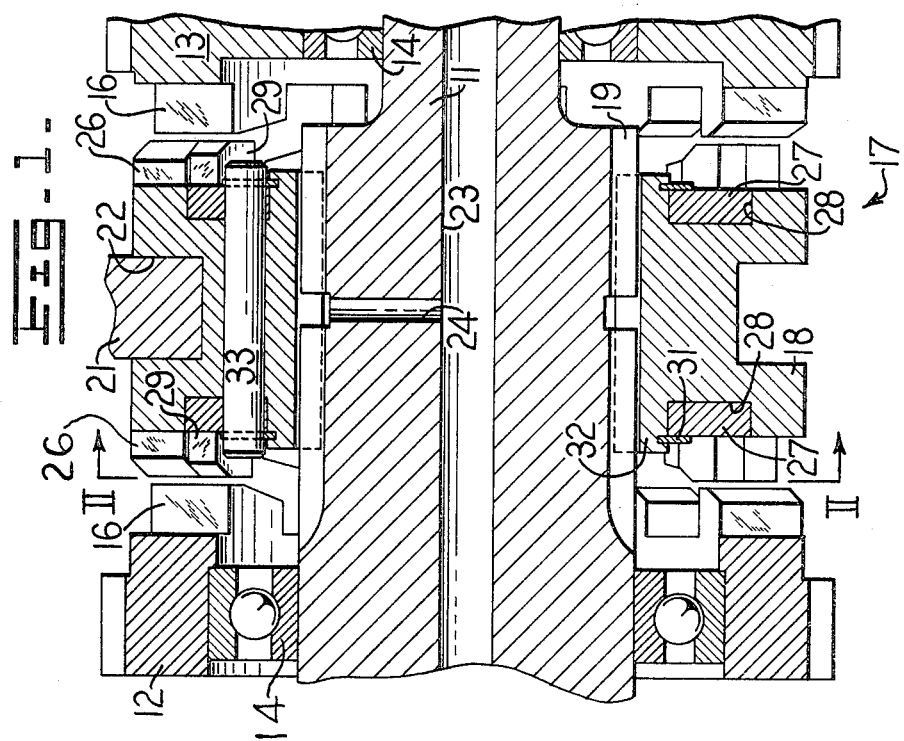
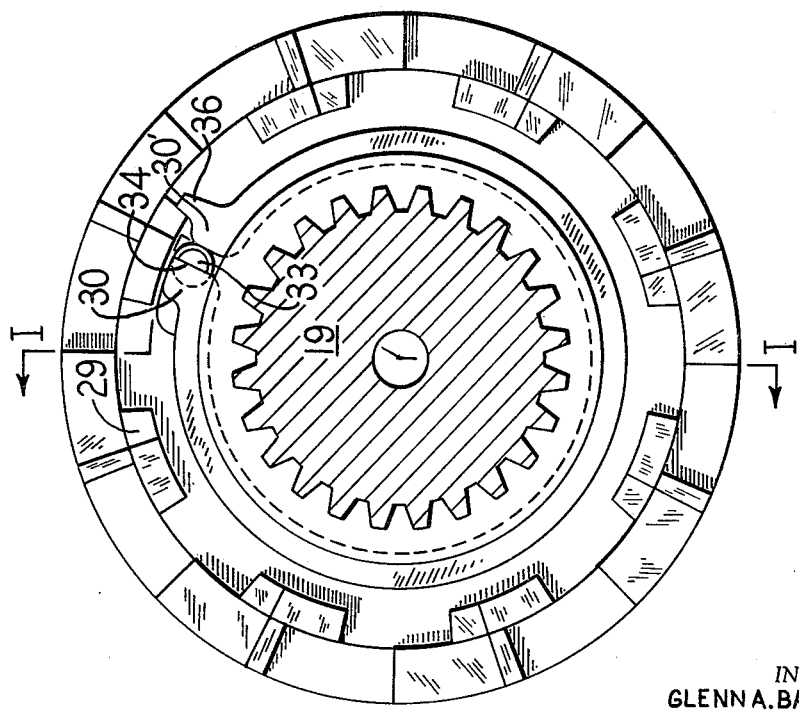
INVENTORS
GLENN A. BALL
LEROY LICHTENSTEIN
PHILIP S. WEBBER
BY
*Fryer, Tjensvold, Feix, Phillips & Lempio*
ATTORNEYS

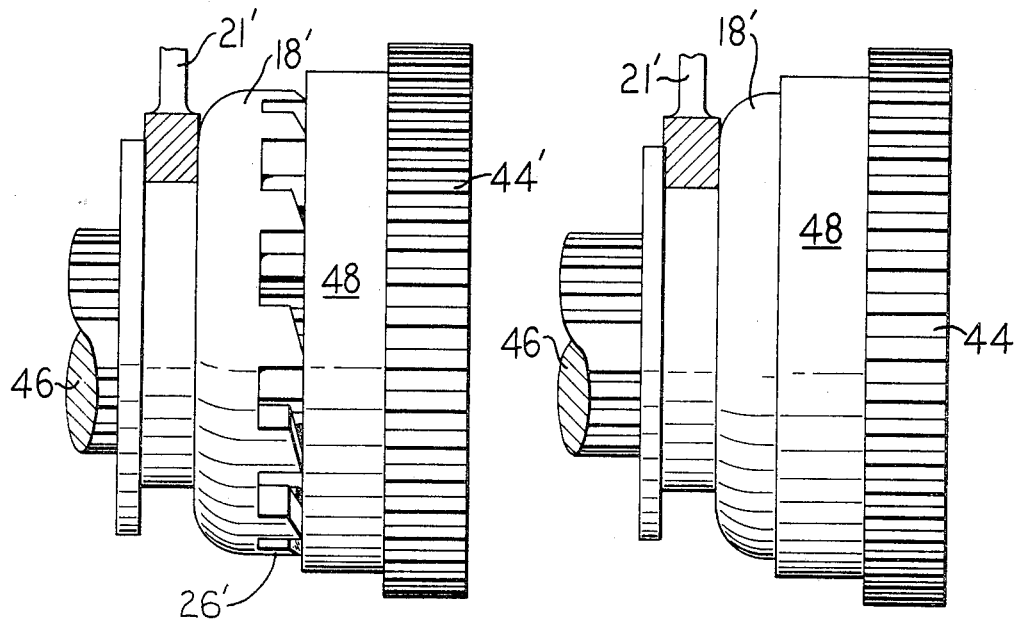
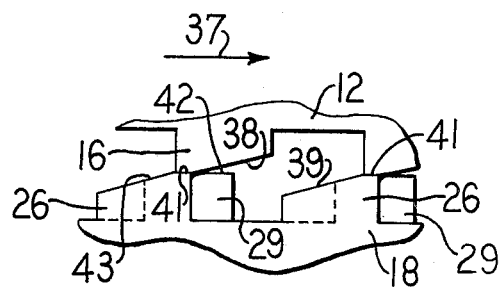
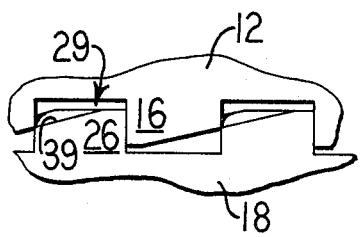

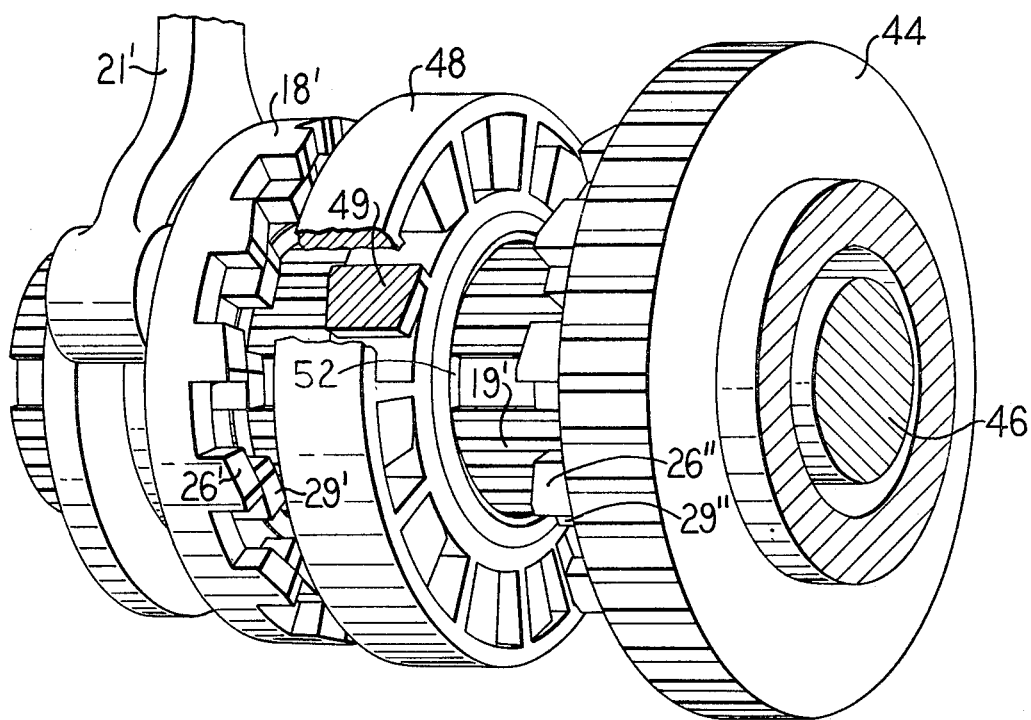

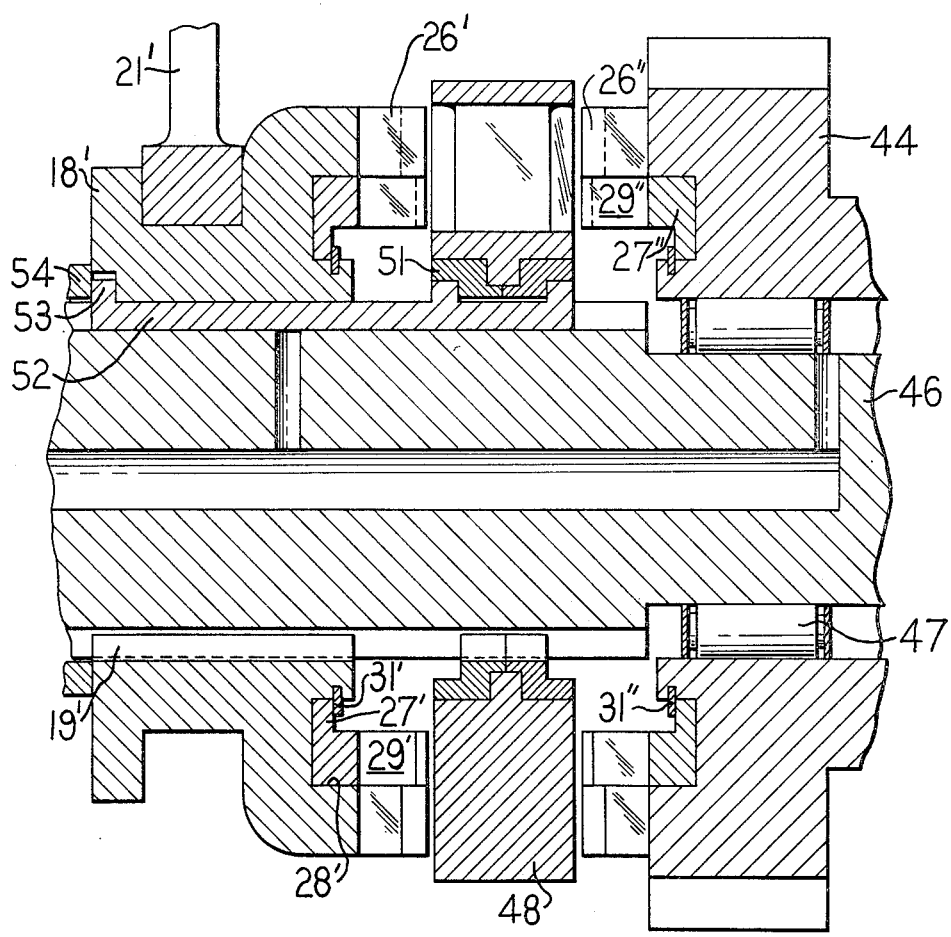

United States Patent Office 3,480,122
Patented Nov. 25, 1969

3,480,122
SELF-SYNCHRONIZING GEAR COUPLER
Glenn A. Ball, Peoria, and Le Roy Lichtenstein and Philip S. Webber, Morton, Ill., assignors to Caterpillar Tractor Co., Peoria, Ill., a corporation of California
Filed Feb. 6, 1968, Ser. No. 703,305
Int. Cl. F16d 11/04; F16h 3/38
U.S. Cl. 192—53                    8 Claims

ABSTRACT OF THE DISCLOSURE

Mechanism for selectively coupling a shaft and a gear carried thereon has a coupler which is splined to the shaft and has teeth for engaging teeth on the gear. When the shaft and gear have unequal speeds, engagement is prevented by a blocker ring with additional teeth that overlap the spaces between the teeth of the coupler. After synchronous speeds have been reached, the blocker ring yields circumferentially to allow meshing of the gear and coupler teeth.

BACKGROUND OF THE INVENTION

This invention relates to mechanism for selectively engaging rotating elements and more particularly to clutch mechanism of the class having teeth which will engage only after the associated rotating elements have substantially similar angular velocities.

Many forms of vehicle transmission and other torque transmitting devices have required design complications because of the need to engage gears or other rotating elements which may not have equal angular speeds at the time engagement is initiated. If simple toothed clutch mechanisms are used for this purpose, clashing, accelerated wear and possible damage may result. To avoid these problems it has been a common practice to utilize bulky synchronizer mechanisms of one form or another. These add considerably to the general complication of the transmission and are still subject to rapid wear.

A form of clutch mechanism which is advantageous for this purpose prevents the engagement of the clutch teeth when the associated rotating elements are turning at different speeds by means of a ring having an additional set of teeth. The additional teeth overlap the gaps between one of the sets of clutch teeth during non-synchronized conditions. If an attempt is made to force the clutch teeth into engagement, one of the sets of teeth merely skates along inclined surfaces of the additional teeth and cannot be forced into the teeth of the other clutch member. The ring carrying the additional teeth is yieldable in a circumferential direction and after the rotating elements have become synchronized, the additional teeth are forced to shift in the circumferential direction and the sets of teeth on the two clutch members may then engage. While this form of gear coupler has many advantages, the constructions heretofore employed have still been unnecessarily complicated. Further, these prior couplers have been effective for relative rotation in only one direction. The prior designs have not been effective to block gear engagements where the rotation of one member relative to the other is in an opposite sense from that for which the unit was designed.

SUMMARY OF THE INVENTION

This invention provides a simple, compact, reliable and durable gear coupler clutch for selectively engaging rotating elements within a transmission or the like which will not engage until the rotating elements have similar angular velocities and which effects a smooth and rapid engagement after synchronization is reached. For this purpose the invention utilizes a toothed circumferentially yieldable blocker ring at the teeth of one of the rotating elements which is positioned and controlled by simplified and highly reliable means. By utilizing such a blocker ring in conjunction with the teeth of both of the rotary elements and by situating a tooth carrying annular member therebetween whereby both rotary elements engage the annular member rather than engaging each other directly, a gear coupler is realized which is effective irrespective of the direction of relative rotation of the two elements.

Accordingly it is an object of this invention to provide a simplified and highly reliable gear coupler mechanism which engages coaxial rotating elements only when the speeds thereof have been synchronized.

It is a further object of the invention to provide a mechanism of the character described above which is operative irrespective of the direction of relative rotation of the two rotary elements.

The invention, together with further objects and advantages thereof, will best be understood by reference to the following description taken in conjunction with the accompanying drawings.

BRIEF DESCRIPTION OF THE DRAWINGS

In the accompanying drawings:

FIGURE 1 is an axial section view of a rotating shaft within a vehicle transmission including two change-speed gears carried thereon and showing coupler mechanism in accordance with the invention which may be utilized to couple either of the two gears to the shaft for rotation therewith, the plane along which FIGURE 1 is taken being staggered as indicated by the line 1—1 of FIGURE 2;

FIGURE 2 is a cross-section view taken along line II—II of FIGURE 1 further clarifying the structure of the coupler mechanism thereof;

FIGURE 3 is a diagrammatic view illustrating the action of the coupler mechanism of FIGURES 1 and 2 when engagement is attempted and the speeds of the two rotating elements associated therewith are unequal;

FIGURE 4 is a diagrammatic view illustrating the action of the gear coupler mechanism after the two rotating elements associated therewith have reached synchronized speeds;

FIGURE 5 is a perspective broken-out view of a second embodiment of the invention which is effective irrespective of the direction of relative rotation of two elements which are to be selectively engaged and disengaged;

FIGURE 6 is an axial section view of the structure of FIGURE 5 further clarifying the construction thereof;

FIGURE 7 is a side view of the gear coupler of FIGURES 5 and 6 illustrating a first stage in the operation of the mechanism when engagement is attempted while the associated rotating elements are turning at different speeds; and FIGURE 8 is a second side view of the gear coupler of FIGURES 5 to 7 illustrating the action of the mechanism after the associated rotating elements have reached synchronous speeds.

DESCRIPTION OF PREFERRED EMBODIMENTS

Referring now to the drawing and more particularly to FIGURES 1 and 2 thereof, there is shown a rotatable shaft 11 which may, for example, be one of the shafts within a vehicle transmission which carry change-speed gears and transmit torque thereto and therefrom according to the particular gear settings which are selected. Two such gears 12 and 13 are shown mounted on shaft 11 by means of ball bearings 14 which provide for rotation of either gear relative to the shaft except when constraints are introduced as will hereinafter be discussed. To provide for coupling either of the gears to the shaft, each gear carries axially projecting teeth 16 and coupler mechanism 17 is carried on the shaft between the gears for selective engagement therewith.

The coupler mechanism is formed in part by a coupler ring 18 disposed coaxially upon shaft 11 between gears 12 and 13 and which is constrained against rotation relative to the shaft by a spline connection 19 thereto. Splines 19 also provide for axial movement of the coupler ring 18 relative to the shaft 11 between the gears 12 and 13 to provide for coupling a selected one of the gears thereto as will hereinafter be described in further detail. To effect the desired axial movement of the coupler ring 18, a shifting fork 21 extends into an annular groove 22 in the outer surface of the coupler, the structure and mode of control of such shifting forks being well understood within the art.

To provide lubrication for the sliding movement of the coupler ring 18 along shaft 11 as well as to lubricate other moving elements of the mechanism, an oil passage 23 may extend axially within the shaft 11 and a radially directed branch passage 24 in the shaft extends from passage 23 to approximately the mid-point along the length of splines 19.

To engage with either of the gears 12 and 13, gear teeth 26 project axially from each end of coupler ring 18 and have a configuration suitable for meshing with the teeth 16 of the gears upon appropriate axial shifting of the coupler ring. Thus when the coupler ring 18 is moved axially one of the gears 12 and 13 and shaft 11 are constrained to rotate together due to the interlocked gear teeth and the action of splines 19.

The structure as described to this point constitutes a clutch coupler which is effective to make the desired selective connections between shaft 11 and either of the gears 12 and 13. However, in the absence of additional structure, an attempt to engage either of the gears 12 and 13 with shaft 11 could result in clashing, accelerated wear, and possible damage if the shaft and gear happen to be turning at different speeds. Considering now the mechanism by which the present invention avoids these effects, a blocker ring 27 is carried at each end of coupler ring 18 in coaxial relationship therewith. Each blocker ring 27 fits into an annular groove 28 in the end surface of coupler 18 radially inward from teeth 26 and adjacent thereto and has axially projecting gear teeth 29 which function to block engagement of the associated coupler ring teeth 26 with the teeth 16 of the adjacent gear except when the speed of the gear and shaft 11 is synchronized as will hereinafter be discussed in more detail.

An important aspect of the invention resides in the simple and reliable manner in which the blocker rings 29 are retained in grooves 28 by means which also serve to impart a limited degree of circumferential movability to the blocker rings and further, to provide a resilient resistance to such movement. In particular, a resilient snap ring 31 is situated in each groove 28 axially outward from the associated blocker ring 27 and radially inward from teeth 29. To retain the blocker ring 27 in position, the radially innermost edge of the snap ring 31 extends into an annular slot 32 in the adjacent surface of groove 28, the ring being seated in the slot by being momentarily expanded and being held therein by the inherent resiliency of the ring.

Referring now to FIGURE 2 in particular, snap rings 31 have a gap at one point around the circumference thereof defining two adjacent ends 30 and 30' of each snap ring, with one end 30 being abutted against a pin 33 which extends axially through coupler ring 18 in order to block circumferential movement of the blocker ring in one direction. A shelf 34 may be formed at each end of the pin 33 to receive the flat abutting end 30 of the associated snap ring 31. The other end 30' of each snap ring 31 has a tang 36 which projects a small distance in the radial direction and abuts one of the teeth 29 of the blocker ring. Thus, the blocker ring 29 may shift circumferentially about the axis of the coupler ring 18 for a limited distance with such movement being resisted by the resiliency of the snap ring 31.

Operation of the gear coupler mechanism is aided by provided the several teeth described above with specific configurations. In particular, the teeth 16 of gears 12 and 13 are dimensioned and positioned radially to span both the teeth 26 of coupler ring 18 and the teeth 29 of blocker ring 27. Thus, if the teeth 29 of the blocker ring are positioned circumferentially to overlap the gaps between the teeth 26 of the coupler ring, the coupler ring teeth cannot be forced into engagement with the gear teeth 16. This effect is best illustrated in diagrammatic FIGURE 3 which illustrates the blocker ring teeth 29 partially overlapping the gaps between coupler ring teeth 26 and thereby blocking the entrance of gear teeth 16 into such gaps even though an axial force is applied tending to bring the gear teeth into engagement, this being the condition which exists when the rotation speed of gear 12 in the direction indicated by arrow 37 exceeds the rotational speed of coupler ring 18 in such directions. The blocker ring teeth 29 are urged towards this overlapping relationship to teeth 26 by the force of the hereinbefore described snap ring 31 and there is no significant counterforce exerted against the blocker ring teeth under these rotational conditions which would tend to move the blocker ring teeth back out of their overlapping relationship to coupler ring teeth 26. Thus under this condition the teeth 16 of the gear tend to skate across the end surfaces of the combined teeth 26 and 29. The facilitate this action both gear teeth 16 and coupler ring teeth 26 have similar profiles characterized by inclined end surfaces 38 and 39, respectively, except for relatively short sections 41 at the trailing end which sections are flat and normal to the rotary axis of the system. The blocker ring teeth 29 have profiles characterized by a flat normal end surface 42 over a major portion of the length thereof followed by a relatively short trailing end surface 43 inclined at an angle similar to the inclination of surfaces 38 and 39 of gear teeth 16 and coupler ring teeth 26.

Referring now to FIGURE 4, the teeth 29 of the blocker ring are shifted circumferentially when the gear 12 and coupler ring 18 pass through synchronism. As soon as the speed of the gear 12 drops minutely below the speed of the coupler ring 18, the teeth 16 of the gear slide against the inclined surface 39 of the coupler ring teeth 26 and in the process force the teeth 29 of the blocker ring in a circumferential direction against the action of the hereinbefore described snap ring 31 to a position at which the coupler ring teeth and blocker ring teeth are aligned. Thus the gear teeth 16 are enabled to enter the spaces between the coupler ring teeth 26 and the desired positive engagement between the gear and the coupler ring is effected.

The coupler mechanism as described above is effective to block gear engagement at non-synchronous speeds for only one direction of relative angular motion. In many instances this is all that is necessary in that the associated transmission or other apparatus has structural or operational constraints which prevent attempted engagements under oppositely directed relative rotation. In many other instances the external constraints are not present and it is desirable that the gear coupler mechanism be effective to block non-synchronized engagements for rotation in either rotational direction. FIGURES 5 and 6 illustrate a modification of the invention which accomplishes this result.

In FIGURES 5 and 6 a gear 44 is shown mounted coaxially on a rotatable shaft 46 by roller bearings 47 together with modified coupler mechanism for selectively engaging the gear and the shaft. The coupler mechanism is again comprised of a coupler ring 18' carrying axially projecting teeth 26' which have the configuration hereinbefore described with reference to the embodiment of FIGURES 1–4. Coupler ring 18' is disposed coaxially with respect to the shaft 46 and is axially movable therealong by means of a shift fork 21' while being locked thereto with respect to angular motion by a spline connection 19'. A blocker ring 27' is disposed in a groove 28' of the coupler ring and carries axially projecting teeth 29'. The blocker ring 27' is held in place and subjected to a circumferential spring force by a snap ring 31' as previously described.

Similarly, gear 44 carries axially projecting teeth 26" and another blocker ring 27" with blocker ring teeth 29", the blocker ring being retained and spring-biased by another snap ring 31", the arrangement and configuration of the several elements being similar to that hereinbefore described.

In this embodiment of the invention the teeth 26" of the coupler ring 18" and the teeth 29" of gear 44 do not directly engage under any conditions but rather each set of teeth may be engaged with a free wheel 48 disposed coaxially on shaft 46 between the gear and coupler ring. As best shown in FIGURE 5 in particular, free wheel 48 has teeth 49 with the configuration hereinbefore described to engage both teeth 26' and 26". When both sets of teeth 26' and 26" are engaged with teeth 49 of the free wheel 48 in this manner, drive is transmitted between coupler ring 18' and gear 44 and thus the gear is in effect engaged with the shaft 46. Conversely when coupler ring 18' is retracted from the free wheel 48 and the free wheel is in turn retracted from gear 44, the gear is decoupled from the shaft.

During disengagement of the gear coupler mechanism it is desirable that coupler ring 18' and free wheel 48 move away from the teeth 26" of gear 44 and it is further necessary that the teeth 26' of the coupler ring move out of the teeth 49 of the free wheel. Thus, during disengagement, the axial movement of free wheel 48 should be stopped prior to stopping of the axial movement of the coupler ring 18'. For this purpose free wheel 48 is journaled to shaft 46 by means of a split bearing 51 which is engaged by three keepers 52 that are equiangularly spaced around the axis of shaft 46 and extend therealong. Each such keeper 52 extends between coupler ring 18' and shaft 46 and has a radially directed tang 53 which abuts against an annular stop 54 to limit axial movement of free wheel 48 after the free wheel has disengaged from gear teeth 26". Keepers 52 are sufficiently long that coupler ring 18' may be further retracted until teeth 26' are disengaged from free wheel 48 at which point further axial movement of the coupler ring is stopped by abutment against the keeper tang 53.

In operation, engagement of the gear coupler mechanism is initiated by urging coupler ring 18' towards gear 44 by appropriate manipulation of the shifting fork 21'. If the rotation is clockwise as viewed from a point facing the teeth 26" of gear 44, contact of the coupler ring teeth 26' with the end of free wheel 48 will urge the free wheel towards gear 44 and at the same time impart rotation to the free wheel. However, owing to the hereinbefore described action of the blocker ring 27' the coupler teeth 26' will not engage with the teeth 49 at this time. Rather, free wheel 48 will engage the teeth 26" of gear 44 since the relative rotations thereof are opposite to what is needed to block such engagement. Thus at this stage the mechanism will appear as shown in FIGURE 7 wherein free wheel 48 is engaged with gear 44 but not with coupler ring 18'.

When the rotational speeds of coupler ring 18' and free wheel 48 reach synchronism and pass very slightly therebeyond, the teeth 26' of the coupler ring may then engage the free wheel to arrive at the relationship illustrated in FIGURE 8. At this engaged position of the mechanism both coupler ring 18' and gear 44 are engaged with free wheel 48 and since the coupler ring is splined to shaft 46, the gear is in effect coupled thereto also.

If the relative rotations are in an opposite sense from that described above, the sequence of engagements of the several elements will be reversed from that depicted in FIGURES 7 and 8. In particular, free wheel 48 will engage first with coupler ring 18' and then subsequently with gear 44 after synchronism has been reached.

While the invention has been described with reference to usage within a vehicle transmission, it will be apparent that the coupler mechanism is applicable to other torque transmitting structure. Similarly, it will be apparent that the invention may be adapted to the direct coupling of a gear to a gear rather than a gear to a shaft as in the examples herein described. Thus, many variations in the detailed structure of the invention are possible.

What is claimed is:

1. Clutch mechanism comprising:
a pair of rotary elements spaced along a common axis of rotation and each having a set of axially extending teeth at the adjacent ends,
an intermediate rotary element disposed between said pair of rotary elements in coaxial relationship therewith, said intermediate rotary element having a set of teeth at each end for engaging said teeth of said rotary elements to transmit torque therebetween,
the teeth of at least one of each adjacent pair of sets thereof having end surfaces which are inclined relative to a plane normal to said axis of rotation,
means for shifting at least two of said rotary elements along said axis of rotation to bring said rotary elements together for engaging said sets of teeth thereof to transmit torque between said pair of rotary elements and for withdrawing said elements from engagement with each other,
a pair of blocker rings each being between said intermediate element and a separate one of said pair of elements in coaxial relationship therewith and each being carried on one of said rotary elements and having at least a limited amount of angular freedom of motion relative thereto, each of said blocker rings having a set of teeth which overlap the spaces between the adjacent teeth of the associated rotary element on which the blocker ring is carried at a first angular position of the blocker ring relative thereto and which are clear of the spaces between said teeth at a second angular position relative thereto, and
resilient means urging said blocker rings towards said first angular positions thereof.

2. Clutch mechanism as defined in claim 1 further comprising a keeper element extending parallel to said axis of rotation and having means for forcing axial movement of said intermediate rotary element upon axial movement of one of said pair of rotary elements and providing for a greater axial travel of said one of said pair of rotary elements than said intermediate rotary element whereby each of said rotary elements may be disengaged from any of the others thereof upon operation of said means for shifting said rotary elements.

3. Clutch mechanism as defined in claim 1 wherein said teeth of said blocker rings have end surface areas with an inclination corresponding to that of said adjacent set of teeth of the associated one of said rotary elements.

4. Clutch mechanism as defined in claim 1 wherein said blocker rings are carried on said pair of rotary elements.

5. Clutch mechanism as defined in claim 1 wherein said mechanism selectively couples a gear and a shaft with said gear constituting a first of said pair of rotary elements and wherein the second of said pair of rotary elements is a coupler ring splined to said shaft and movable axially therealong, said intermediate rotary element being a free wheel disposed coaxially on said shaft.

6. Clutch mechanism as defined in claim 1 wherein said blocker rings are retained on said associated one of said rotary elements by an annular resilient snap ring which is also the resilient means urging said blocker rings toward said first angular positions thereof.

7. Clutch mechanism as defined in claim 6 wherein said snap ring has a gap defining ends of the snap ring which are spaced apart a small distance, with a first end bearing against an element fixed with respect to the associated rotary element which carries the blocker ring and having the second end bearing against one of said teeth of said blocker ring to exert a force thereon urging said blocker ring towards the first angular position thereof.

8. Clutch mechanism comprising:

first and second coaxial rotary elements each having a set of axially extending teeth with the teeth of said first rotary element having end surfaces which are inclined relative to a plane normal to the axis of rotation of said elements, said first rotary element having an annular groove defining the radially innermost surface of said teeth thereof and having an annular slot in the wall of said groove opposite said innermost surface of said teeth, said teeth of said first rotary element being of less thickness in the radial direction than the teeth of said second rotary element, means for selectively effecting axial movement of at least one of said rotary elements to engage and disengage said sets of teeth thereof, a blocker ring disposed in said groove of said first rotary element in coaxial relationship thereto, said blocker ring having a set of axially extending teeth adjacent the teeth of said first rotary element said blocker ring being movable in an angular direction relative to said first rotary element whereby said teeth of said blocker ring have a first angular position overlapping the spaces between the teeth of said first rotary element and having a second annular position at which the teeth of said blocker ring are clear of the spaces between the teeth of said first rotary element, and a flat annular resilient snap ring carried on said first rotary element, the radially innermost edge of said snap ring being in said slot and the radially outermost edge of said snap ring overlapping said blocker ring to retain said blocker ring in said groove of said first rotary element, said snap ring having a projection engaging at least one of said teeth of said blocker ring to exert a circumferentially directed force thereon urging said blocker ring toward said first angular position thereof.

References Cited

UNITED STATES PATENTS 2,200,851    5/1940    Osborne.
2,864,476    12/1958   Ashauer et al.
3,044,592    7/1962    Noll _____ 192—53 XR MARK M. NEWMAN, Primary Examiner A. P. HERRMANN, Assistant Examiner U.S. Cl. X.R.
74—339; 192—67